United States Patent

Thomire et al.

[11] Patent Number: 5,865,288
[45] Date of Patent: Feb. 2, 1999

[54] HYDRAULICALLY CONTROLLED CLUTCH RELEASE BEARING FOR A MOTOR-VEHICLE DIAPHRAGM CLUTCH

[75] Inventors: Sylvain Thomire, Levallois; Jean-Pierre Giroire, St Germain En Laye, both of France

[73] Assignee: Valeo, France

[21] Appl. No.: 722,230

[22] PCT Filed: Feb. 6, 1996

[86] PCT No.: PCT/FR96/00192

§ 371 Date: Oct. 9, 1996

§ 102(e) Date: Oct. 9, 1996

[87] PCT Pub. No.: WO96/24782

PCT Pub. Date: Aug. 15, 1996

[30] Foreign Application Priority Data

Feb. 9, 1995 [FR] France .................................. 95 01700
Sep. 14, 1995 [FR] France .................................. 95 10750

[51] Int. Cl.$^6$ .............................. F16D 25/08; F16D 23/14
[52] U.S. Cl. ................................... 192/85 CA; 192/91 A; 192/98
[58] Field of Search ............................ 192/91 A, 85 CA, 192/98; 92/169.1

[56] References Cited

U.S. PATENT DOCUMENTS 3,004,438  10/1961  Funk et al. .
4,399,898   8/1983  Olschewski et al. .......... 192/85 CA X
4,561,531  12/1985  Young et al. ...................... 192/85 CA
4,960,193  10/1990  Hodge .................................... 192/91 A
5,547,058   8/1996  Parzefall et al. ..................... 192/85 CA
5,620,076   4/1997  Voit et al. .......................... 192/91 A X

FOREIGN PATENT DOCUMENTS 0 095 841  12/1983  European Pat. Off. .
0 168 932   1/1986  European Pat. Off. .
35 04 086   8/1986  Germany .
43 13 346  10/1994  Germany .
2 287 295   9/1995  United Kingdom .

Primary Examiner—Rodney H. Bonck
Attorney, Agent, or Firm—Longacre & White

[57] ABSTRACT

A clutch release bearing comprising a fixed portion (5, 6) including an outer body (5) and an inner support tube (6) concentric therewith and separated therefrom, and defining an axially extending blind ring-shaped cavity (50) capable of being supplied with a fluid and housing an axially movable tubular piston (4) supporting a drive member (3) engageable with the diaphragm (13) of a clutch (1). The rear end (100) of the support tube (6) has a transversely extending ring-shaped flange (61) by means of which it engage a fixed portion (21), particularly the gearbox, and the rear end of the body (5) is recessed for clamping the flange (61) between the body (5) and the fixed portion (21).

6 Claims, 4 Drawing Sheets

HYDRAULICALLY CONTROLLED CLUTCH RELEASE BEARING FOR A MOTOR-VEHICLE DIAPHRAGM CLUTCH The present invention concerns hydraulically controlled clutch release bearings for a diaphragm clutch, notably for a motor vehicle.

The invention concerns more particularly a clutch release bearing having a fixed portion comprising an outer body and a concentric inner support tube distinct from the outer body, defining a blind annular cavity of axial orientation capable of being supplied with fluid and inside which is mounted an axially movable tubular piston carrying a drive member capable of acting on the diaphragm of a clutch.

Such a bearing is described for example in the document FR-A-2 682 950.

This bearing can be supplied by a fluid of the gaseous or liquid type and this is the reason why it is usually referred to as a hydraulically controlled clutch release bearing.

According to various known designs, means are provided for fixing the inner support tube to a fixed element, for example to the casing of the gearbox equipped with a clutch having such a concentric hydraulically controlled clutch release bearing, and means are also provided for fixing the outer body to this same fixed part, the most precise concentricity possible also having to be ensured between these two elements of the fixed portion of the bearing.

The aim of the present invention is to propose a novel design of a hydraulic bearing which makes it possible to simplify the fixing and relative positioning of the two components of the fixed portion of the bearing.

To this end, the invention proposes a clutch release bearing of the type mentioned above, characterised in that the inner support tube has at its rear end an annular flange of transverse orientation, by means of which it bears on a fixed portion, notably on a gearbox, and in that the rear end of the body in indented in order to clamp the flange between the body and the said fixed portion.

Thus the fixing of the outer body makes it possible simultaneously to ensure the fixing of the inner support tube and to reduce the cost price of the clutch release bearing.

According to other characteristics of the invention:
the said annular flange has an annular centering rim of axial orientation for centering the inner support tube in a fixed portion, such as an aperture produced in the gearbox;
the outer periphery of the flange serves as a centering device for the outer body;
the annular centering rim extends axially from a median part of the annular flange;
the mean diameter of the annular centering rim is substantially equal to the diameter of the internal bore of the outer body;
the annular centering rim is received in close contact with the internal bore of an aperture produced in a gearbox for its input shaft to pass;
the annular centering rim extends axially from the outer peripheral edge of the annular flange;
the flange has an axial offset which serves as a centering device for the outer body;
an annular sealing joint is integrated between the opposite parts of the annular flange and the outer body;
the inner support tube is a metallic element produced by deformation, notably by pressing and/or stamping;
the outer body is stepped with a transverse shoulder being formed and has a tubular portion serving to center a preloading spring acting between the shoulder on the outer body and a shoulder on an annular flange belonging to the piston;
the inner tube has a stop for limiting the movement of the piston and for forming, prior to the mounting of the clutch release bearing on its fixed part, a unitary assembly.

In general terms, the inner tube can be thinner than in a conventional embodiment.

Other characteristics and advantages of the invention will emerge from the reading of the detailed description which follows, for an understanding of which reference will be made to the accompanying drawings, in which.

Figure 1:
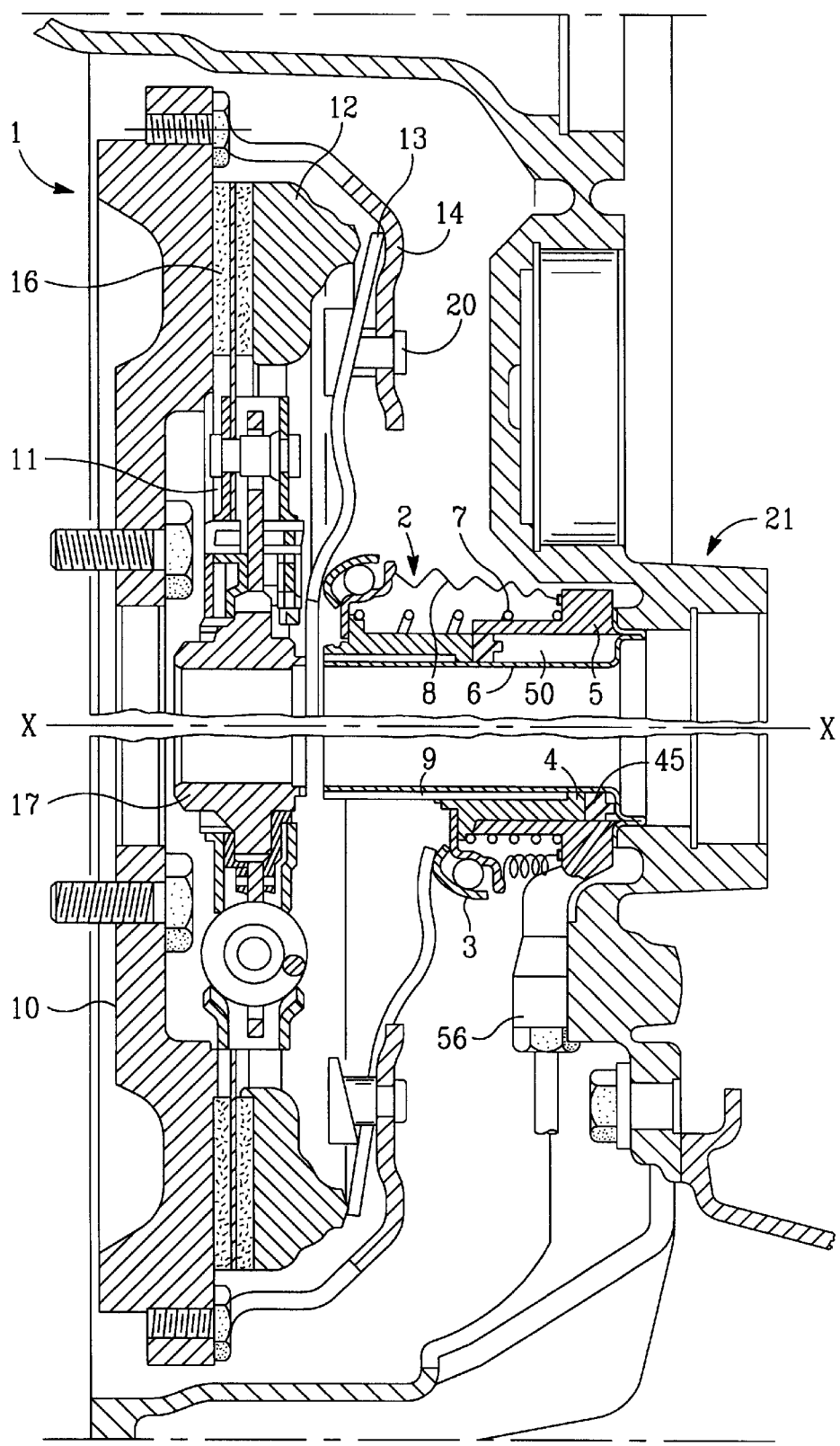
FIG. 1 is a view in axial section of a clutch for a motor vehicle fitted with the clutch release bearing according to the invention.

In FIG. 1, a clutch can be seen at 1 having, in succession axially, a reaction plate 10, a friction disc 11, a thrust plate 12, a diaphragm 13 and a cover 14 in the form of a hollow dish.

The reaction plate 10 is designed to be fixed, here by screws, to a driving shaft, not visible, here the crankshaft of the engine of the motor vehicle, and offers up a friction face to the friction linings 16 which the friction disc 11 has at its outer periphery.

Figure 3:
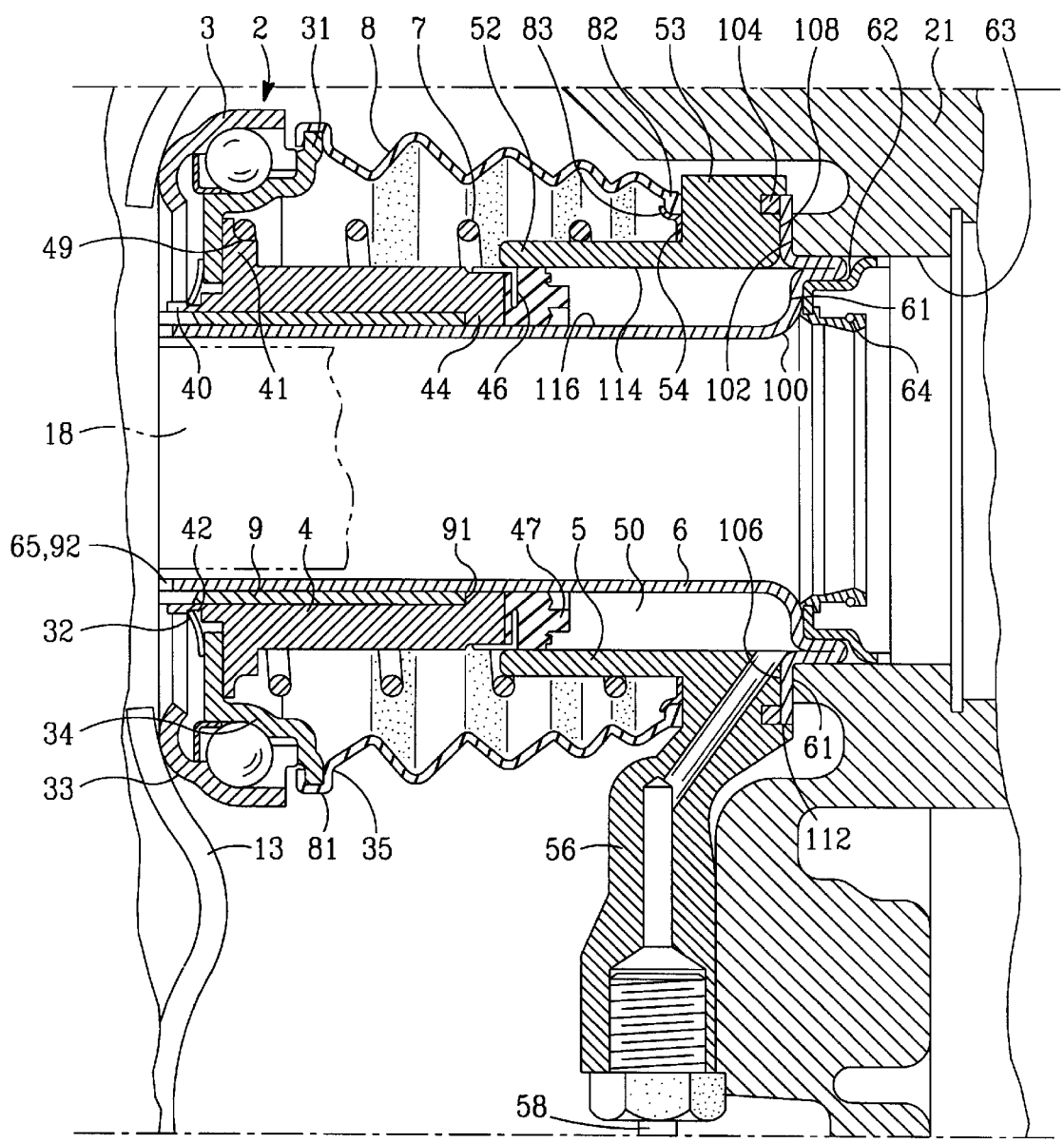
FIG. 3 is a partial view to a larger scale of the central part of FIG. 1.

This friction disc 11 has at its inner periphery a ribbed hub 17 by means of which it is fixed in rotation on the input shaft 18 of the gearbox 21, the said shaft 18 being depicted partially in dotted lines in FIG. 3.

The thrust plate 12 offers up a friction face to the friction disc 11 and is connected in rotation to the cover 14, being mounted so as to be able to move axially in relation to the latter, and in a manner known per se, by means of tangential tongues (not visible).

The hollow cover 14 here surrounds the linings 16, the thrust plate 12 and the diaphragm 13.

It is fixed, by its radial edge, at its outer periphery, to the reaction plate 10, here by screws (not depicted).

The diaphragm 13 has, in a manner known per se, an outer peripheral part in the form of a Belleville washer and a central part divided into radial fingers by slits opening out internally in the central aperture of the diaphragm and externally in broadened orifices located at the inner periphery of the Belleville washer of the diaphragm.

These orifices are passed through by small columns 20 fixed to the base of the centrally perforated cover 14.

The small columns 20 offer a secondary support to the inner periphery of the Belleville washer of the diaphragm 13, opposite a primary support formed by stamping in the base of the cover 14.

At the outer periphery of its Belleville washer, the diaphragm 13, of tapered shape in the free state, rests on a fragmented annular protrusion (not referenced) on the thrust plate 12.

Thus, by virtue of the small columns 20 the diaphragm 13 is mounted pivotally on the cover 14 between its primary and secondary supports and the clutch is normally engaged, the diaphragm 13 resting on the primary support of the cover 14 in order to force the thrust plate 12 in the direction of the reaction plate 10 so as to clamp the friction linings 16 of the disc 11 between the thrust plate 12 and reaction plate 10.

The torque is thus transmitted from the crankshaft to the input shaft of the gearbox 21 via the linings 16 here coupled elastically to the hub 17.

In order to disengage the clutch, in a manner known per se, it is necessary to act here by pushing by means of the clutch release bearing 2 on the inner end of the fingers of the diaphragm 13 in order to make the latter pivot and to cancel the load exerted by the diaphragm 13 on the thrust plate 12, the elastic tongues then returning the thrust plate 12 in the direction of the base of the cover 14 so as to release the friction linings 16 of the disc 11.

Here, the clutch release bearing 2 has a drive member 3 capable of acting on the inner end of the fingers of the diaphragm 13, a movable part, namely an axially movable piston 4, acting on the drive member 3 in order to manoeuvre the latter, a fixed portion 5, 6, here in two pieces 5, 6, defining with the piston 4 a control chamber 50, elastic preloading means 7 interposed between the fixed portion 5, 6 and the piston 4 in order to permanently force the drive member 3 into contact with the fingers of the diaphragm 13 so as to exert a small initial load on the diaphragm 13, a protective bellows 8 and a guide sleeve 9 for guiding the piston 4 during its axial movement.

The control chamber 50 is sealed, as described hereinafter, for the introduction into it of a control fluid, such as air or oil, enabling the chamber to be pressurised or depressurised so as to axially move the piston 4 and the drive member 3.

For reasons of simplicity, the bearing 2 will be referred to as a hydraulically controlled clutch release bearing, the control fluid being of a gaseous or liquid nature.

Here, the drive member consists of a ball bearing provided with a rotating outer raceway 33 profiled in order to come locally into single contact with the inner end of the fingers of the diaphragm 13.

In the example embodiment, the fingers are flat so that the outer raceway of the bearing 13 has, in cross-section, a curved profile.

Naturally, the converse is possible, the fingers of the diaphragm 13 having a curved inner end, whilst the outer raceway 33 of the bearing 3 then has a flat shape.

All this depends on the application, given that a (circular) contact at one point is required.

The inner raceway 34 of the bearing 3, here made of sheet metal, has a transverse annular edge 31, referred to as the inner edge of the bearing 3, directed radially towards the axis of the bearing 2 in order to couple it to the piston 4.

The piston 4 is of tubular shape and has transversely to its front end a transverse annular flange 41 directed radially in the opposite direction to the axis X—X of the unit.

The piston 4 is made from a mouldable material, such as an aluminium-based material, or plastic.

Here, the piston 4 is made from a plastic material having a low coefficient of friction in order to facilitate its movement.

It is on the front face of the flange 41, adjacent to the bearing 3, that the edge 31 of the bearing 3 rests.

The edge 31 is subjected to the action of an axially acting elastic washer 32, a so-called self-centering washer, which bears at its outer periphery on the said edge.

Here, the self-centering washer 32 is a washer of tapered shape whose inner periphery is divided into inclined lugs which bear against the side, furthest away from the flange 41, of a groove 42 made in the piston 4, between the free end of the latter and the flange 41.

The washer 32 thus has a dihedral cross-section and enables the edge 31 to be clamped in contact with the flange 41. Here, the height of the edge 31 is greater than the diameter of the balls of the bearing 3.

Thus the drive member 3 is coupled axially to the piston whilst having the possibility of moving radially in relation to the latter.

A self-centering clutch release bearing is thus created in a manner known per se, enabling the bearing 3 to travel radially in order to center itself in relation to the diaphragm 13, the clamping force exerted by the washer 32 depending on application while being calibrated so that the bearing does not fall under the effect of its own weight.

The control chamber 50 is delimited by two parts 5, 6 fixed in relation to the piston cylinder with the axially movable piston 4, namely an inner tube 6 and an outer body 5 concentric therewith.

The parts 5, 6 thus belong to the aforementioned fixed portion 5, 6.

One of the parts 5, 6 thus consists of an inner guide and support tube 6 surrounding the input shaft 18 of the gearbox 21.

This tube 6, in this case metallic, which is produced, for example, by pressing or stamping, has at its rear end 100 an annular flange 61 of transverse orientation, radially towards the outside, by means of which it bears on the gearbox 21, being thus contiguous with the latter against an annular transverse surface 102 arranged opposite the gearbox.

This tube 6 has an annular centering rim 62 produced in its flange 61 by folding. Here, the rim 62 extends roughly from a median part of the flange 61.

This rim 62, of axial orientation parallel to the X-X axis, enters the aperture 63 produced for example in the form of an internal bore in the gearbox 21 for the passage of its input shaft.

The rim 62 is in close contact with the internal bore forming the aperture 63 so that it is centered by the said bore 63 and the casing of the gearbox 21.

A sealing joint 64 acts at the inner periphery of the rim 62 in order, in a manner known per se, to prevent oil leaking from the gearbox, the said joint 64 being interposed radially between the rim 62 and the input shaft of the gearbox 21.

An annular sealing joint 104 is likewise interposed between the front transverse face 106 of the flange 61 and the rear annular transverse face 108 of the outer radial collar 53 formed at the rear of the outer tube 5.

The annular sealing joint 104 (here toric) is preferably arranged in a groove formed for this purpose in the rear transverse annular face 108.

The outer periphery of the flange 61, that is to say the outer edge thereof, serves to center the outer body 5 constituting the other part of the fixed portion 5, 6.

The body 5 has laterally two perforated brackets 51, with holes in them and roughly diametrically opposed.

It is by means of these brackets 51 that the body 5 is fixed, here by means of screws 110, to the casing 21 of the gearbox.

The rear end of the body 5 is indented, that is to say a countersink 112 is provided, produced by milling, in its rear annular transverse face 108, having a right-angled cross-section for the centering of the body 5 on the outer periphery of the flange 61, in this case metallic, and for the clamping of the flange 61 between the body 5 and the casing of the gearbox 21.

In accordance with the teachings of the invention, the inner tube 6 is thus fixed by clamping to the casing 21 of the gearbox by means of the outer body 5 with its fixing means.

At the same time as the parts 5, 6 are fixed simultaneously, a centering of the inner tube 6 is assured by means of its rim 62 in the bore 63, and a relative centering of the outer body 5 on the inner tube 6 assured by means of the countersink 112 which receives the transverse side 61.

For good load distribution and optimal centering, it will be noted that the mean diameter of the centering rim 62 is substantially equal to the diameter of the inner bore 114 of the body 5 which receives the sliding piston.

The support tube 6 extends in axial projection towards the front in relation to the body 5.

This body 5, in this case in a mouldable material, surrounds the tube 6.

It is thus of tubular shape and extends axially in axial projection in relation to the casing of the gearbox 21, just like the tube 6.

Thus the chamber 50 is of annular, cylindrical shape and of axial orientation, being delimited at its outer periphery by the tubular body 5, at its inner periphery by the tube 6, at one of its axial ends by the flange 61, forming the base of the chamber 50, and at its other axial end by the movable piston 4.

Thus the tube 6 closes the chamber 50, the body 5 in this case being aluminium-based.

Naturally, the O-ring seal 104 intervenes between the flange 61 and the rear indented face of the body 5 to seal the chamber 50.

In operation, contaminants such as impurities, dirt or the like can be deposited on the tube 6.

In order to prevent these contaminants from entering the chamber 50, it is proposed that a baffle be created.

Thus the front end of the tube 6 (its free end) is surrounded by the aforementioned guide sleeve 9.

The sleeve 9 constitutes a barrier blocking the access of contaminants to the tube 6, to the rear end 44 of the piston 4 and to the chamber 50.

Here, the sleeve 9 has at its front end fixing catches 92 capable of engaging as described hereinafter in complementary apertures 65 produced at the front end of the tube 6, which serves as a support for the body 5 and sleeve 9.

Beyond the sleeve 9, the tube 6 serves as a guide for the rear end of the piston 4 and for a joint 45 carried by the said rear end 44.

This joint 45 has two lips for cooperation respectively with the internal bore 114 of the body 5 and the outer periphery 116 of the tube 6.

It has centerally in axial projection a stud 47 capable of coming into abutment against the flange 61 in order to reduce noise.

The joint 45 is attached to the rear end 44 of the piston 4 by means of a centering piece 46 of annular shape.

This piece 46 is metallic and has a right-angled cross-section with a transverse part anchored (embedded) in the joint 45 and an axial part engaged on the outer periphery of the piston and provided with inclined, serrated lugs obtained by cutting and folding.

These lugs each engage by virtue of their catch in a groove produced in the outer periphery of the rear end of the piston 4.

As will have been understood, the joint 45 equipped with its piece 46 is installed by being snapped into place, the lugs of the piece 46 spreading in order to then come into engagement with the side of the groove in the piston 4 nearest the rear face of the piston 4.

Naturally, the piston 4 has externally a change in diameter at its rear end 44 so that the axial part of the piece 46 does not project in relation to the outer periphery of the piston 4.

The body 5 is stepped in diameter and has a tubular front portion 52 projecting axially in relation to a thicker rear portion 53 carrying the brackets 51.

A transverse shoulder 54 is thus formed externally in the area where the diameter of the body 5 changes.

The outer periphery of the portion 52 serves as a centering device for the aforementioned elastic pre-loading means 7.

These means 7 consist in this case of a coil spring bearing on the shoulder 54 and on a transverse shoulder formed at the outer periphery of the flange 41 of the piston 4 on the rear face of the said flange.

This shoulder belongs to an annular hollow 49 produced at the outer periphery of the flange 41.

This hollow 49 reveals an area of axial orientation enabling the last turn of the axially oriented spring 7 to be centered.

The inner raceway 34 of the bearing 3 extends radially above the flange 41 and is extended at this outer periphery by an edge 35, referred to as the outer edge of the bearing 3, directed radially in the opposite direction to the axis of the unit.

This edge 35 is likewise offset axially in the opposite direction to the balls of the bearing 3, in this case sealed in a manner known per se, by virtue of its housing and a joint not referenced in FIG. 1.

By virtue of this arrangement it is possible to mount the front end 81 of the bellows 8, in this case of tapered shape, on the outer edge 35 by nesting, the front end 88 having an annular groove for receiving the edge 35.

At its rear end of smaller diameter the bellows 8 has a rim 82 capable of being sandwiched between the shoulder 54 and an edge of a sinuous part 83.

It is by means of this part 83, in this case metallic, that the spring 7 bears on the shoulder 54.

In other words, the spring 7 enables the part 83 to be clamped in contact with the shoulder 54, the said part 83 enabling, radially beyond the spring 5, the rim 82 for securing the bellows 8 to be clamped in contact with the shoulder 54.

It will be appreciated that the bellows 8, which is concertina shaped, surrounds and protects the spring 7, the piston 4 and the chamber 50, preventing the ingress of contaminants, dirt, impurities or the like.

Thus the bellows 8 surrounds the spring 7, which in turn surrounds the tubular portion 52, the piston 4 and the chamber 50.

Thus the chamber 50 is well protected both by the bellows 8 and by the guide sleeve 9.

The pre-loading spring 7, the piston 4 with its flange 41, the sleeve 9, the tube 6 and the tubular portion 52 are located radially below the main part of the non-rotating inner raceway 34 of the bearing 3, the said raceway 34 being of roughly axial orientation, being equipped at its inner periphery with the edge 31 and at its outer periphery with the edge 35.

Thus the piston 4, the spring 7 and the portion 52 are housed below the main part of the raceway 34 in order to reduce the axial dimension.

This pre-loading spring 7 rests on the flange 41 on a circumference of diameter greater than the circumference on which the self-centering washer 32 rests, which is thus of reduced size.

Thus the piston 4 has at its front end a tubular nose 40 projecting axially in relation to its flange 41 and enabling, by virtue of the groove 42, the self-centering washer 32 to be installed and the movement of the edge 31 and bearing 3 to be limited, a predetermined radial clearance existing between the internal bore of the edge 31 and the outer periphery of the nose 40.

The springs 32 and 7 exert axial forces in opposite directions on the flange 41, which is conducive to the smooth sliding of the piston 4.

The main part of the inner raceway 34 of the bearing 3 is directed axially towards the body 5 and also surrounds the flange 41 so as to be conducive to a reduction of the axial dimension of the bearing 2.

By virtue of the edge 31 it is possible to reduce the height of the flange 41 and to form the nose 40.

The supply to the chamber 50 is effected through the rear, the thicker rear portion 53 of the body 5 carrying two transversely projecting nozzles 56, 57 respectively for supplying and draining the chamber 50.

These nozzles 56, 57 extend transversely in parallel to the front face of the casing of the gearbox 21.

The nozzles 56, 57 are disposed on both sides of a fixing hole (FIG. 1) produced in the casing of the gearbox 21.

The supply and drainage channels, formed in the nozzles 56, 57, have a transverse portion extended by an inclined portion opening out at the flange 61 and tube 6, that is to say in the base of the chamber 50.

This arrangement allows the available space to be used optimally and the axial dimension of the bearing 2 to be reduced, each nozzle 56, 57 thus having a transversely orientated part extended by an inclined part for connection to the thicker rear end in the form of a collar 53 on the body 5.

It will be noted that the fingers of the diaphragm 13 have a curved intermediate zone, which likewise allows the axial dimension to be reduced.

Thus in FIG. 1 the upper part of this figure shows the bearing 2 in the extraction position when the clutch is disengaged and the lower part of the figure shows the bearing 2 in the retracted position when the clutch is engaged.

In this retracted position the inner raceway 34 of the bearing 3 partly surrounds the portion 52 of the body 5, and the bellows 8, of tapered form, is compressed without interfering with the nozzles 56, 57.

As is known, the bearing according to the invention forms a receiver of the concentric type controlled by a master cylinder (not visible) operated by a clutch pedal.

Here the control fluid is oil. Naturally the fluid can be gaseous in nature.

The clutch release bearing is produced in the form of a subassembly by virtue of the spring 7 holding the body 5 against the flange 61 and the piston 4 against the rear end 91 of the sleeve 9.

Naturally, the flange 61 can have lugs (or tenons) entering into complementary holes in the body 5, being locked by crimping.

Here, the front end of the sleeve 9 has at least one catch 91 and the front end of the tube 6 a complementary open indentation 65.

The catch 92, forming a tenon, is engaged in the indentation 55 forming a mortice, contact being made between the catch and the base of the indentation 65, then locking is effected by producing laterally a crimp causing the material of the lateral edges of the indentation 55 (FIG. 4), whose edges have a U-shaped cross-section, to yield.

The sleeve 9 is thus fixed axially and with respect to rotation by crimping and connection of shapes with the tube 2.

Figure 5:
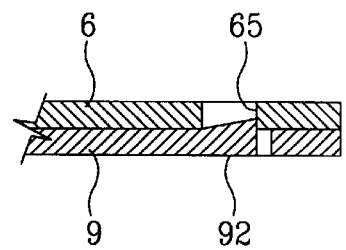
FIG. 5 is a partial view in axial section showing the connection means between the inner tube and the guide sleeve.
Figure 2:
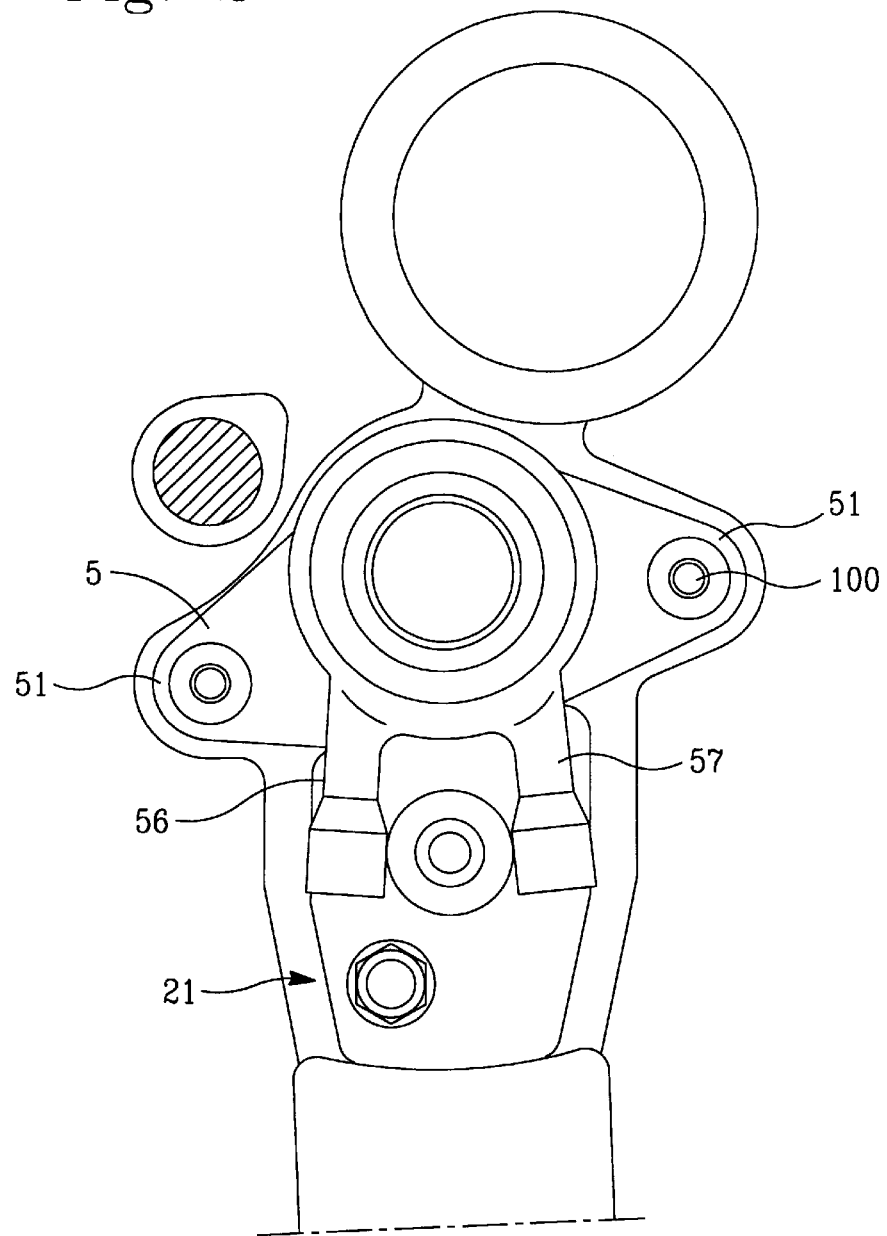
FIG. 2 is a side view of the outer body of the clutch release bearing of FIG. 1.

In a variant (FIG. 5) the indentation 65 can be closed and the catches 92 can belong to elastically deformable longitudinal lugs cut from the sleeve.

Mounting is effected by snapping in, causing the sleeve 9 to be fixed axially and with respect to rotation.

In a variant, the indentation is closed and the catch 92 moulded in one piece with the sleeve 9.

Mounting is then effected by means of force-fitting.

In all cases a fixing of the sleeve 9 to the tube 6 is obtained.

Preferably at least two catches 92 and two diametrically opposed indentations 55 are provided.

It will be appreciated that the body 5 does not need to be machined in a precise manner, the areas for guiding the piston 4 being formed by the outer periphery of the sleeve 9 and by the outer periphery 116 of the tube 6, the joint 45 being guided by the tube 6 and the internal bore 114 of the body 5.

The production and simplified assembly of the fixing portion in two pieces is preferable as the inner tube 6 can have a smaller thickness than when the fixed portion is made in one piece.

This tube 6 is thus obtained in an economical manner.

In addition, with a fixed portion in two parts, it is easy to produce supply and drainage channels associated with the nozzles 56 and 57, for example by drilling, given the fact that the said channels are installed at the rear of the outer body 5 and are partially inclined.

Naturally, the fixed portion can be in three parts, namely an outer body 5, an inner tube 6 and a base connected to the tube.

In this case, the guide sleeve 9 can be moulded onto the tube 6.

Figure 6:
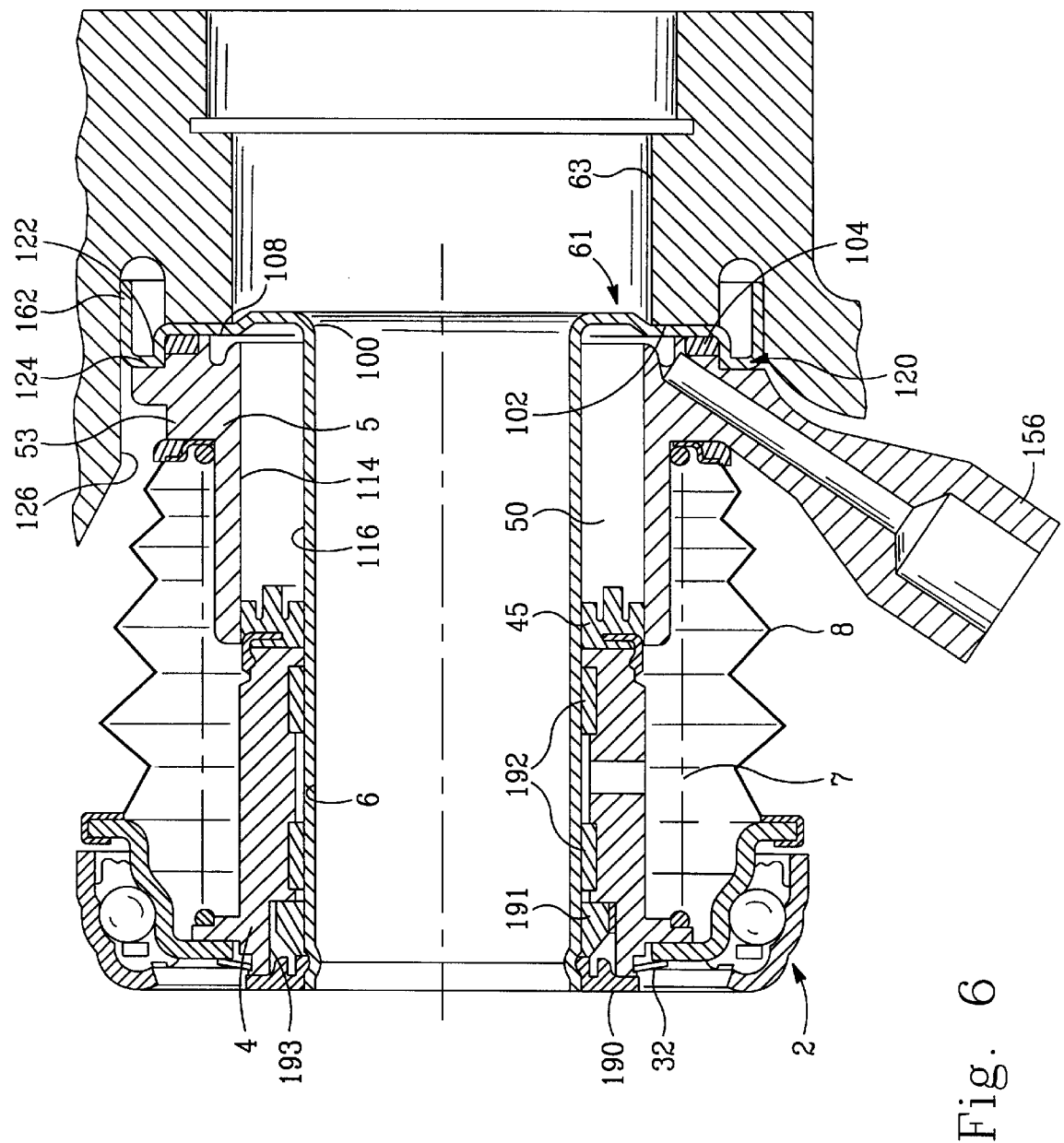
FIG. 6 is a view similar to that of FIG. 3 which illustrates a second embodiment of the fixing of the inner tube by means of the outer body.

The second embodiment of the invention will now be described, which is illustrated in FIG. 6, in which components identical or similar to those described above are designated by the same reference numbers.

As can be seen in this figure, the transverse flange 61, which extends the inner tube 6 at its rear part 100, has, in transverse section, an annular offset 120 of annular orientation which delimits an area 122 for centering the body 5 on the tube 6 and which is received in an indentation 124 of complementary shape formed in the annular rear transverse face 108 of the body 5.

The indentation 124 is thus delimited by an annular area of axial orientation on which the area 122 is closely fitted, and by a transverse shoulder for the axial bearing of the offset 120 directed towards the piston 4.

The flange 61, beyond its offset 120 of axial orientation, is extended, in the opposite direction to the piston 4, by an axially orientated part in the form of a bush 162 which provides a centering function equivalent to that of the rim 62 produced by folding in the first embodiment illustrated in FIGS. 1 and 3.

The peripheral rim 162 (of annular shape) is here received in a cylindrical concave area 126 produced in the casing of the gearbox 21, the area 126 being able to be in as-moulded condition.

The simultaneous mounting and clamping of the fixed parts 5 and 6 are provided, as in the case of the first embodiment, by the clamping in position by its flanges (not depicted) of the outer body 5 on the fixed part 21 of the casing of the gearbox.

It is of course also possible to arrange a sealing joint 64 (not depicted in FIG. 6) as in the case of the first embodiment.

It will be noted that the supply nozzles 156 and drainage nozzles (not visible) extend here in an inclined manner and that the piston 4 has two rings 192 split for sliding along the outer periphery of the inner tube. In this case the sleeve 9 of FIG. 1 is omitted and the piston 4 has at its free end a scraper joint 191 mounted in a housing 193 produced at the free end of the piston 4 by virtue of a change in the diameter of its internal bore. The joint 191 prevents oil leaking in the direction notably of the friction linings of the disc 11. A ring 190 masks the housing 193.

Figure 4:
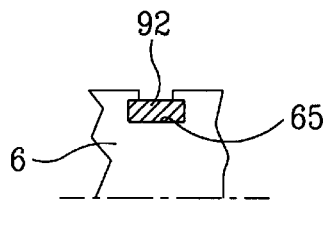
FIG. 4 is a partial view of the joining means between the inner tube and the guide sleeve.

This ring is mounted on the tube 6, for example, in the same way as the sleeve 9 of FIG. 1, that is to say notably as in FIG. 4. Here, mounting is effected by snapping in, the ring 193 having at its inner periphery a rim engaging in a groove produced at the free end of the tube 6.

As in FIG. 1, the ring 190, advantageously made of plastic material, limits the movement of the piston 4 by cooperating with the edge of its free end.

As will have been understood, the ring 190 or the sleeve 9 constitutes a stop limiting the axial movement of the piston 4 by cooperating either with the shoulder 91 or the free end of the piston 4.

Thus there is no risk of the joint 45 escaping from the body 5.

By virtue of the stop 5, 190, it is possible to form, prior to mounting the clutch release bearing 2 on the fixed portion 21 of the vehicle, a manipulatable and portable unitary assembly by virtue of the pre-loading spring 7 acting between the piston 4 and the body 5 while allowing a contact between the piston 4 and its associated stop 9, 190 and a contact between the support tube 6 and the rear face 108 of the collar 53 of the body 5, the latter then being centered by the outer periphery of the flange 61 or by the return 120.

The outer body 6 is thus in abutment against the flange 61.

It will be appreciated that the formation in two parts 5, 6 of the fixed portion facilitates machining of the body 5 and the formation of the supply channels for the supply and drainage nozzles.

Naturally, the outer raceway 3 of the bearing can be flat for contact with the end of the fingers of the diaphragm 13, these then being curved.

By virtue of the scraper joint 191 and the split rings 192 the chamber 50 is also protected against the entry of impurities in combination with the stop ring 190 forming a mask and a baffle.

Figure 7:
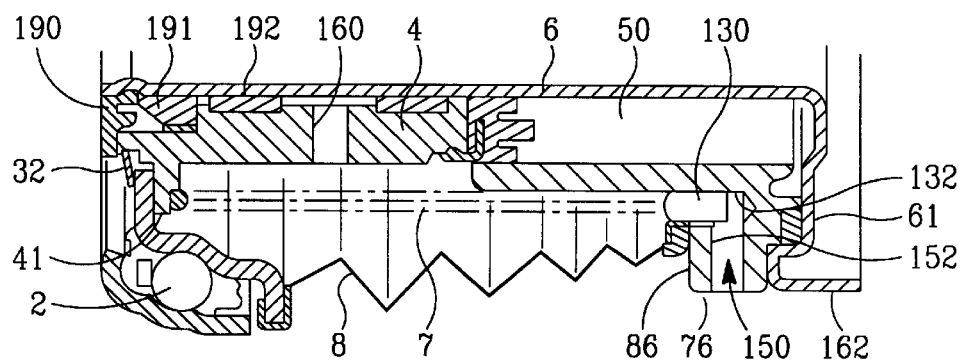
FIG. 7 is a half view similar to FIG. 6 for another example embodiment.

Given that the bellows 8 delimits, with the piston 4, the body 5 and the bearing 3, a sealed housing, it is possible to drill a channel 160 (FIG. 7) in the piston to collect the oil leaks present between the inner bore of the piston 4 and the outer periphery of the tube 6.

By virtue of the scraper joint 191 the oil leaks enter the sealed housing and can be discharged via a channel 150. This L-shaped channel 150 is then produced in the rear portion 53 of the body 5 and has an axial part 132 and a transverse part 152 produced in a nozzle 76 in one piece, by moulding, with the rear portion 53. A conduit is connected to the nozzle 76 in order to discharge the oil.

The part 131 serves to house with clearance the axially oriented end strand 130 of the pre-loading spring 7 thus fixed with respect to rotation to the body 5. The other end of the spring 7 has an inclined strand in contact with the flange 41, hollowed to receive this strand.

The piston 4 is thus fixed in rotation. Naturally, for example in FIG. 3, an axial drilling can be produced in the portion 53 for mounting the axial strand of the end of the spring 7.

This mounting of the spring 7 so as to lock in rotation is transposable in all the Figures.

In a general manner, the installation of the clutch release bearing is simple. This is because the support 6 is placed on the body 5 or vice versa, then the part 83 is fitted and the bellows 8 put in place, and afterwards the spring 7 is fitted, followed by the sleeve 9 or the stop 190. Finally the bearing 3, the washer 32 and the other end of the bellows are installed.

Naturally the bearing can first be mounted on the piston. In operation the piston 4 moves along the inner tube 6 when the chamber 50 is pressurised. It returns to its retracted position under the action of the diaphragm 13 (lower part of FIG. 1, chamber 50 depressurised).

It thus emerges from the description and the drawings that the clutch release bearing 2 forms a receiver of the concentric type controlled by a master cylinder operated by the clutch pedal and that the piston 4 projects axially in relation to the outer body 5, sliding axially along the inner support tube 6 mounted in a concentric manner in relation to the outer body 5, extending in axial projection in relation thereto.

The outer body 5 and the inner tube 6 thus define an axially oriented blind annular cavity 50 capable of being supplied with pressurised fluid.

Inside this blind cavity is mounted so as be able to move axially the tubular piston delimiting the control chamber 50 formed in part by the said blind cavity.

Naturally the clutch release bearing 2 may not be of the self-centering type, the bearing 3 then being fitted on the piston 4.

We claim:

1. Hydraulically controlled clutch release bearing for a clutch (1) with a diaphragm (13) having a fixed portion (5, 6) comprising an outer body (5) in a mouldable material and a concentric inner support tube (6), distinct from the outer body (5) and defining a blind annular cavity (50) of axial orientation capable of being supplied with fluid and inside which is mounted an axially movable tubular piston (4) carrying a drive member (3) capable of acting on the diaphragm (13) of a clutch (1), wherein the inner support tube (6) has at its rear end (100) opposite the diaphragm (13) an annular flange (61) of transverse orientation by means of which it bears on a fixed part (21), and wherein the rear end of the body (5) opposite the diaphragm (13) is indented (112, 124) for clamping the flange (61) between the body (5) and the said fixed part (21), and wherein the annular flange (61) has an annular centering rim (62, 162) of axial orientation for centering the inner support tube (6) in a fixed portion, and the annular centering rim (162) extends axially from the outer peripheral edge of the annular flange (61).

2. Bearing according to claim 1, wherein the flange (61) has an axial offset (120, 122) which serves as a centering device for the outer body (5).

3. Bearing according to claim 1, wherein an annular sealing joint (104) is interposed between the annular flange (61) and the outer body (5, 108).

4. Bearing according to claim 1, wherein the inner support tube (6) is a metallic element produced by one of pressing and stamping deformation.

5. Bearing according to claim 1, wherein the outer body (5) is stepped with a transverse shoulder (54) being formed and has a tubular portion (52) serving to center a pre-loading spring (7) acting between the shoulder (54) on the outer body (5) and a shoulder on an annular flange (41) belonging to the piston (41).

6. Bearing according to claim 1, wherein the inner tube (6) has a stop (9, 190) for limiting the movement of the piston (4) and for forming, prior to the mounting of the clutch release bearing (2) on said fixed part (21), a unitary assembly by virtue of the pre-loading spring (7) holding the piston (4) in contact with the said stop (9, 190) and the outer body (5) in contact with the flange (61) of the inner support tube (6).

* * * * *